United States Patent [19]

Maynard

[11] Patent Number: 5,783,254

[45] Date of Patent: Jul. 21, 1998

[54] PAINT APPLICATOR METHOD

[76] Inventor: Robert G. Maynard, 597 Cedar Dr., Lexington, N.C. 27292

[21] Appl. No.: 939,222

[22] Filed: Sep. 29, 1997

[51] Int. Cl.$^6$ .............. B32B 35/00; B05D 3/10; B05D 1/36; B67D 5/42
[52] U.S. Cl. .......... 427/140; 427/333; 427/336; 427/340; 427/407.1; 222/386
[58] Field of Search .................. 427/140, 333, 427/336, 340, 407.1; 222/386; 510/201, 202, 213; 401/176

[56] References Cited

U.S. PATENT DOCUMENTS

| 4,263,911 | 4/1981 | McCormack et al. | 128/276 |
| 4,655,372 | 4/1987 | Ross et al. | 222/391 |
| 4,729,791 | 3/1988 | Laura et al. | 106/14.23 |
| 4,962,868 | 10/1990 | Borchard | 222/49 |
| 5,071,479 | 12/1991 | Gruening | 106/18.32 |
| 5,077,086 | 12/1991 | Cavill | 427/142 |
| 5,268,215 | 12/1993 | Krenceski et al. | 428/213 |
| 5,326,001 | 7/1994 | Holmquist et al. | 222/387 |
| 5,520,787 | 5/1996 | Hanagan et al. | 204/409 |

*Primary Examiner*—Shrive Beck
*Assistant Examiner*—Michael Barr

[57] ABSTRACT

This invention provides a paint solvent mixture well suited for use in cleaning excess paint on minor paint touch-ups performed on vehicle bodies. A syringe with specialized blunt needles is used to apply paint to vehicle body paint without further marring the paint. A method for using such a syringe is also described.

8 Claims, 3 Drawing Sheets

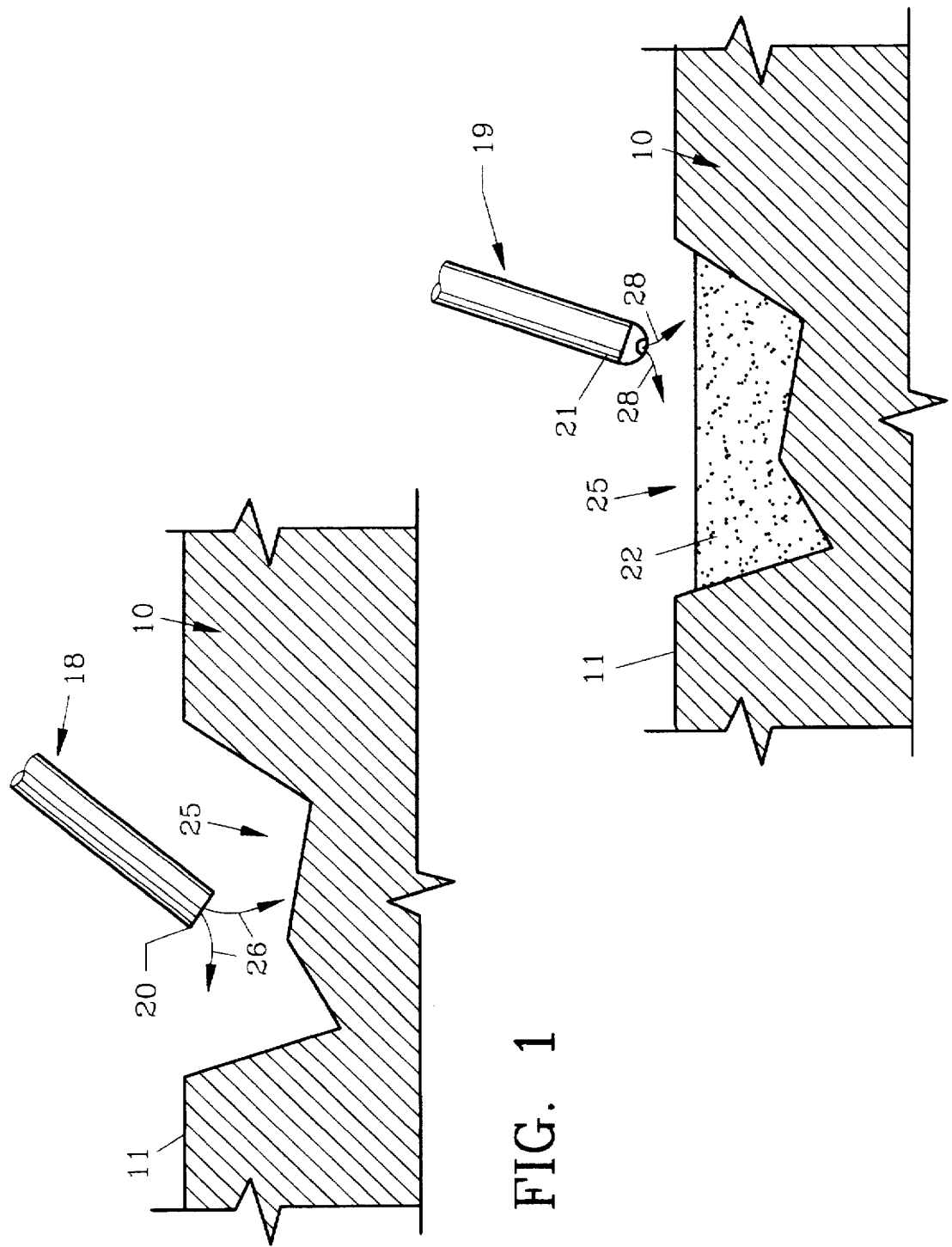

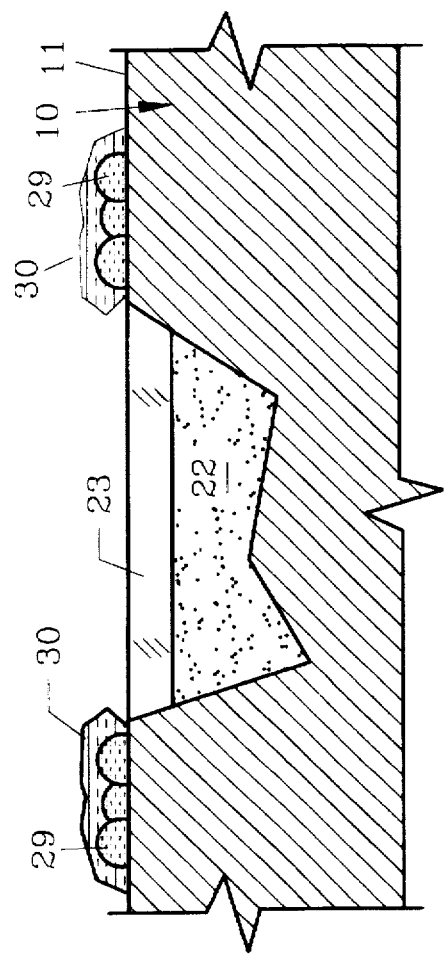
FIG. 3
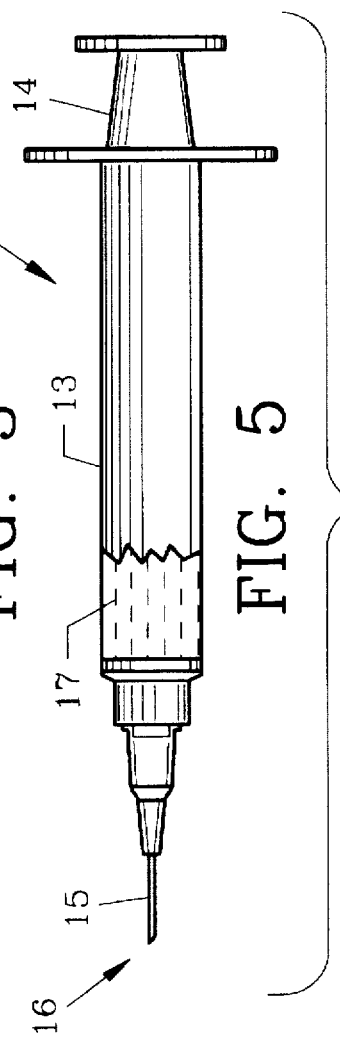
FIG. 5
FIG. 7
FIG. 6
PRIOR ART

PAINT APPLICATOR METHOD

BACKGROUND OF THE INVENTION

1. Field of the Invention

This invention pertains to an improved paint applicator and method well suited for use in touching up vehicle body paint and a solvent for use with the same.

2. Description of The Prior Art And Objectives Of The Invention

Auto repair specialists have long experimented with methods of touching up marred, scratched and nicked paint on automobiles and other vehicles that have been damaged by collisions, vandals or run-away shopping carts. However damaged, dings, nicks and scratches in the body paint are not only unsightly and value reducing, but also are accelerators of rust on metal auto bodies. Salt from winterized roads, rain and other natural elements pierce the blemished paint and corrode the metal underneath. This further reduces the value of the car as well as reducing the structural integrity of the vehicle.

To the cost conscious consumer, a small nick or ding is hardly worth the time and money to drive the car to a paint shop and have the paint professionally restored. In an attempt to overcome the need for expensive paint sprayers and the like, weekend mechanics have turned to more mundane means to effectively touch up slightly marred paint.

One such approach has been to use a conventional disposable hypodermic syringe. The operator fills the reservoir in the syringe with a desired paint solution and then attempts to apply the paint to the blemish through the needle. Conventional needles have a sharp, slanted distal end, designed to pierce skin so that medicines or the like may be delivered subcutaneously. Such sharp needles are poorly suited for the application of paint. The sharp distal end may inadvertently gouge, pit or scratch the paint that the user is trying to repair, and in some cases exacerbating the problem, especially if the paint is fairly thin. For example, conventional paint finishes on auto bodies are on the order of 5 mm thick, if a blemish is 2 mm deep, then there is no margin for error while inserting the needle into the blemish. The conventional needle may be much too narrow for the scratch or blemish at hand and repeated passes are required to completely coat the blemish with fresh paint.

It is also known to apply a coat of transparent paint or sealant composition to the touch-up paint to insure proper sealing. Once all of these steps have been completed, the surface of the touch up paint may be uneven proximate the repaired blemish and a standard solvent is frequently used on a cloth to wipe away excess paint or sealant from around the area of the repair.

Thus, with the problems associated with the conventional methods of touching up vehicle paint, it is an objective of the present invention to provide an economical, easy method and apparatus to touch up vehicle paint.

It is a further objective of the present invention to provide an improved paint solvent well suited for use in vehicle paint repairs.

It is still a further objective of the present invention to provide an applicator and method suitable for touching up scratches, pits and other blemishes in paint without causing additional damage.

It is yet another objective of the present invention to provide an applicator of varying widths and method suitable for touching up scratches, pits and blemishes for applying paint in layers.

It is another objective to increase the efficiency and decrease the cost of repairing minor paint blemishes.

Further objectives and advantages of the invention will become readily apparent to those skilled in the art upon further reference to the detailed description below.

SUMMARY OF THE INVENTION

The above recited objectives are accomplished through the use of a modified hypodermic syringe fitted with one of two modified blunted needles to apply paint to a vehicle body. The first needle has a flat distal end and the second needle has a rounded convex distal end, both of which tend to reduce or eliminate the risk of pitting or further marring the paint during use. A paint "wipe off" composition or solvent comprising mineral oil, acetone, xylene and linseed oil is used to effectively smooth the surface of the repaired paint after application with the syringe.

In use, paint is drawn into the syringe through the blunt tip of the needle into the reservoir. The blemish is prepared to receive paint by cleaning, light abrading or sanding. Paint of a desired color is then injected into the blemish in layers until the newly applied paint substantially fills the blemish. Next, a clean syringe is used to apply a transparent sealing composition to cover the newly applied paint. The solvent is then used in conjunction with a cloth or other rag to wipe away any excess paint inadvertently applied to the vehicle body surface.

BRIEF DESCRIPTION OF THE DRAWINGS

FIG. 1 shows a schematic view of the needle inserted proximate the area of a blemish on motor vehicle body paint;

FIG. 2 illustrates a schematic view of said blemished area following discharge of colored paint;

FIG. 3 demonstrates a schematic view of said blemish area after application of a transparent sealing layer;

FIG. 5 pictures a side elevation view of a prior art hypodermic syringe with a standard needle;

FIG. 6 depicts an enlarged side elevation view of a needle having a flat tipped distal end;

FIG. 7 shows an enlarged side elevation view of a needle having a smooth and convex distal end.

DETAILED DESCRIPTION OF THE PREFERRED EMBODIMENT AND OPERATION OF THE INVENTION

Figure 4:
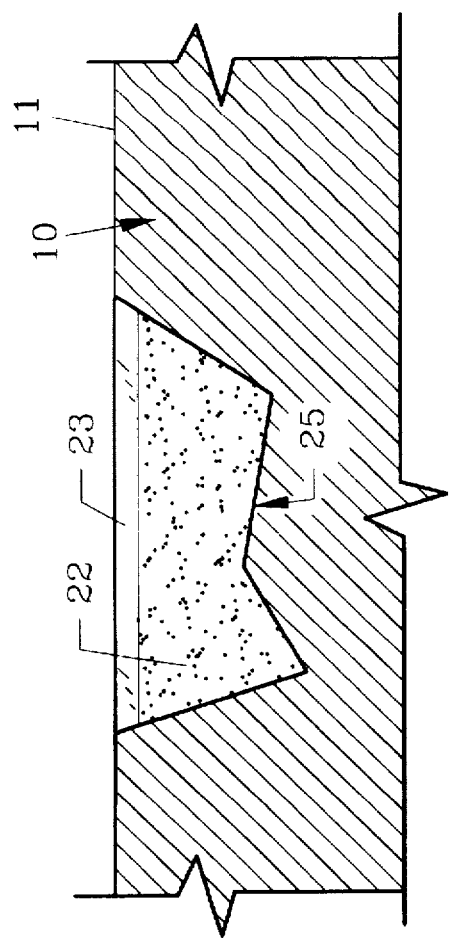
FIG. 4 features a schematic view of the painted surface having all excess paint removed therefrom.

For a better understanding of the invention, turning now to the drawings, specifically FIG. 5 shows a prior art paint applicator embodied in hypodermic syringe 12 with reservoir 13, plunger 14 and conventional hypodermic needle 15. Needle 15 includes a distal end having slanted, sharp edge 16. In use, reservoir 13 of prior art syringe 12 would be filled with liquid paint composition 17 and dispensed through needle 15. Slanted, sharp edge 16 could cause additional damage to a painted surface being repaired as inadvertent picking or gouging may occur.

The present invention solves this and other problems by providing cylindrical steel or other metal needles having a non-tapered shaft with blunted distal ends as seen in FIGS. 6 and 7. These blunt ends prevent additional gouging of paint 10 (See FIGS. 1–4). It is to be understood that paint 10 represents the sort of pigmented paint conventionally found on a vehicle body. "Blunt" herein defines a needle tip or end which is dull to prevent piercing of human skin without applying a great, unusual amount of force. In FIG. 6, needle 18 has flat distal end 20 perpendicular to the longitudinal axis of needle 18. In FIG. 7, needle 19 has smooth, rounded, convex distal end 21. Convex end 21 is the geometric equivalent of an outwardly projecting hemisphere attached to flat end 20. It is to be understood that needles 18 and 19 are otherwise conventional in that they are hollow and adapted to be received on conventional syringe 12. The preferred method of forming needles 18 and 19 is to grind a conventional needle 15 having sharp, slanted end 16 until blunt end 20 or 21 as desired is achieved. Other methods of making blunt ended needles 18 and 19 through machine molding processes can also be achieved.

Figure 8:
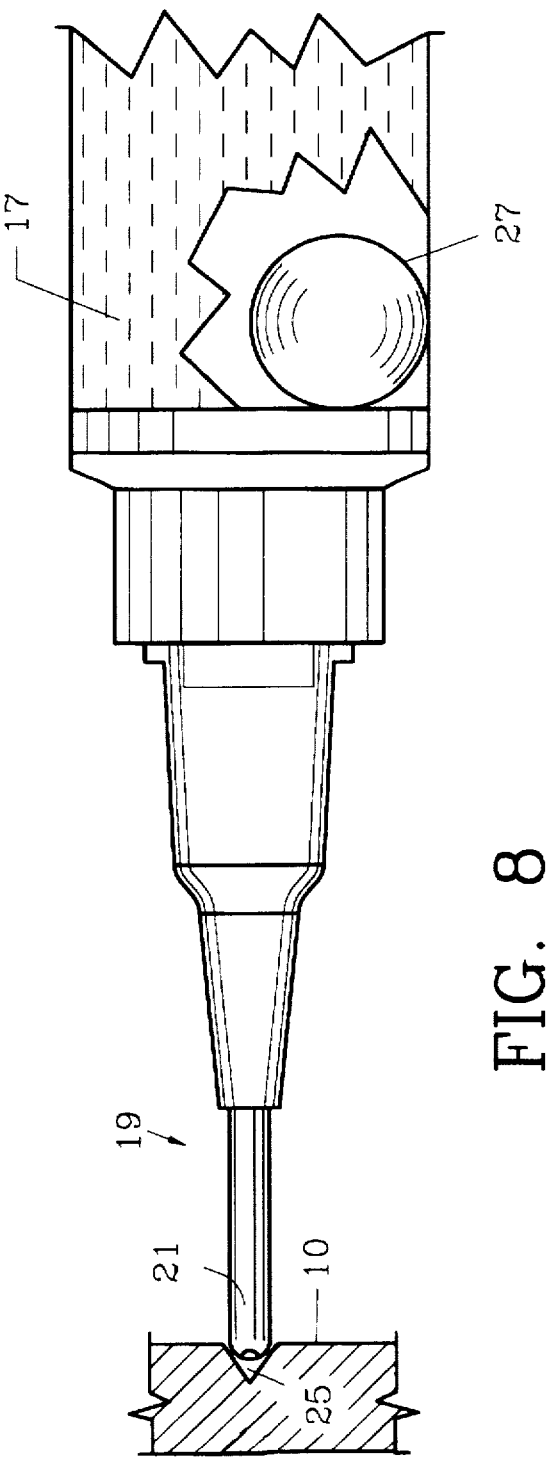
FIG. 8 illustrates a much enlarged schematic view of the needle of FIG. 7 on a syringe inserted within a blemish in a painted surface of a vehicle body.

In the preferred embodiment of the paint applicator of the present invention, seen best in FIG. 8, syringe 12 has needle 19. Syringe 12 includes reservoir 13 with ball bearing 27 disposed therein. Ball bearing 27 is preferably steel or similar metal such that ball bearing 27 is much denser than paint 17. While different sized ball bearings are contemplated, preferred ball bearing 27 is four millimeters in diameter to fit within a standard syringe for agitation of paint 17 by manual shaking as needed.

FIGS. 1–4 show the preferred method of using the applicator of the present invention. In FIG. 1, blemish 25 is located on paint 10 on a conventional vehicle body (not shown). Blemish 25 is a small, unsightly depression in paint 10 that breaks planar surface 11 which needs repair or touch up to preserve the aesthetic appeal of paint 10. This includes, but is not limited to: scratches, dings, divots, pits, and voids. Syringe 12 is filled with liquid pigmented paint 17 matched to the color of paint 10 as is conventional, and distal end 20 of needle 18 is placed in blemish 25 for paint application as will be explained below. In the event that syringe 12 will not be used immediately after being filled with paint 17, paint 17 will tend to separate into its component parts. Dense metal ball 27 is used to remix paint 17 immediately prior to application. Much as in a conventional aerosol paint can (not shown) syringe 12 can be agitated in such a manner as to cause ball 27 to remix paint 17 into a desired uniform consistency.

Once paint 17 is remixed, syringe 12 is then brought proximate blemish 25 as seen in FIG. 1 and plunger 14 is pressed to dispense paint 17 into blemish 25 as indicated generally by arrows 26. Flat end 20 of needle 18 tends to preclude the creation of additional blemishes because the blunt end slips easily into blemish 25 and has no sharp edges to gouge paint 10. In the event that blemish 25 is deep, multiple layers of paint can be applied by syringe 12. Depending on the drying rate of liquid paint 17, time is allowed for liquid paint 17 to dry (See dry paint 22 in FIG. 2). Dry paint 22 substantially fills blemish 25 and brings planar surface 11 approximately, but not entirely, to its pre-blemished planar condition. If blemish 25 is deeper than one layer of paint 17 would substantially fill, multiple layers may be applied by allowing paint 17 to dry and repeating the process until dry paint 22 substantially fills blemish 25.

Next, a clean syringe 12 is filled with a conventional transparent paint material 28, preferably a conventional polyurethane composition which acts as a sealant. Clean syringe 12 can be a new syringe used only for the application of transparent composition 28, or the original syringe filled with paint 17 could be cleaned and reused. In the preferred method of use, needle 19 with convex end 21 is used to apply transparent composition 28 to partially filled blemish 25 as generally indicated in FIG. 2. When dry, transparent composition forms transparent ply 23 over dry paint 22 and generally brings blemish 25 level with planar surface 11 of paint 10.

Unfortunately, such manual application is not machine precise and excess paint 29 may surround blemish 25 as seen in FIG. 3. This can be as unsightly as the original blemish and such excess paint 29 should be removed. Many conventional paint solvents exist which can be used, but the present invention provides paint solvent 30 to effectively remove or "wipe-off" excess paint 29.

Paint solvent 30 is preferably blended at room temperature in a suitable container by mixing one part xylene, one part mineral oil, one part linseed oil and one part acetone, all conventional and commercial grade, wherein each part is measured by volume. Thus, to make a one liter supply of solvent 30, two hundred fifty (250) ml of xylene, two hundred fifty (250) ml of mineral oil, two hundred fifty (250) ml of linseed oil and two hundred fifty (250) ml of acetone are blended manually and stored for future use.

In use, wipe off solvent 30 is applied to a conventional fabric shop towel (not shown) and said towel is used to wipe off any excess paint 29 from paint finish 10. The result is seen in FIG. 4 where planar surface 11 is restored to a fully clean, planar condition. Blemish 25 is filled with dry paint 22 and transparent ply 23 and paint finish 10 is once again aesthetically pleasing.

In an alternate use of the paint applicator of the present invention, syringe 12 is used with needle 19 having convex end 21 and filled with pigmented paint 17 before application to blemish 25. This technique is well suited for long linear scratches such as are made when for example, a car key is maliciously directed along the side of a vehicle body by vandals. Smooth, convex end 21 of needle 19 provides near frictionless engagement with paint 10 and allows syringe 12 to be used much as pencil to touch up paint 10. When blemish 25 is substantially filled clear sealant composition 28 is applied as described above and any excess paint 29 is removed with the preferred solvent.

The preceding recitation is provided as an example of the preferred embodiments and are not meant to limit the nature or scope of the present invention.

I claim:

1. A method of touching up blemishes in vehicle body paint using a syringe having a reservoir, said method comprising the steps of:
   a) providing said syringe with a removable, elongated needle having a blunted distal end;
   b) filling the reservoir with pigmented paint;
   c) placing a ball bearing within the reservoir;
   d) agitating the ball bearing within the reservoir to mix said paint;
   e) positioning the distal end of the needle proximate the blemish in the vehicle body paint,
   f) discharging paint from said reservoir through the blunted distal needle end into the blemish g) applying a coat of a transparent sealant over the discharged paint; and h) removing excess paint.

2. The method as claimed in claim 1 wherein the step of providing said syringe with a needle having a blunted distal end comprises providing a needle with a flat distal end.

3. The method as claimed in claim 1 wherein the step of providing said syringe with a needle having a blunted distal end comprises providing a needle with a smooth, convex distal end.

4. The method as claimed in claim 1 wherein the step of removing excess paint comprises using a mixture having by volume one part linseed oil, one part mineral oil, one part xylene and one part acetone.

5. The method as claimed in claim 1 wherein the step of discharging paint from said reservoir into the blemish comprises the steps of a) applying a first layer of paint;

b) allowing said first layer of paint dry;

c) repeating steps a and b as necessary to fill said blemish.

6. The method as claimed in claim 1 wherein the step of discharging paint from said reservoir through the blunted distal needle end comprises discharging paint through a flat needle end.

7. The method as claimed in claim 1 wherein the step of discharging paint from said reservoir through the blunted distal needled end comprises discharging paint through a smooth, convex needle end.

8. The method as claim in claim 1 wherein the step of positioning the distal end of the needle in the blemish comprises positioning the distal end of the needle below the top surface of the paint.

* * * * *